United States Patent
Yoon et al.

(10) Patent No.: US 7,994,157 B2
(45) Date of Patent: Aug. 9, 2011

(54) METHOD FOR DISPERSING PLANT STEROL FOR BEVERAGE AND A PLANT STEROL-DISPERSED BEVERAGE, OF WHICH PARTICLE SIZE IS NANOMETER-SCALE IN DISPERSED BEVERAGE

(75) Inventors: Won-Tae Yoon, Seoul (KR); Kab-Sig Kim, Kyonggi (KR); Bo-Chun Kim, Seoul (KR); Jung-Hee Han, Kyonggi (KR); Hyung-Pyo Hong, Seoul (KR)

(73) Assignee: KIP Biotech LLC, Minnetonka, MN (US)

( * ) Notice: Subject to any disclaimer, the term of this patent is extended or adjusted under 35 U.S.C. 154(b) by 922 days.

(21) Appl. No.: 10/398,001

(22) PCT Filed: Sep. 28, 2001

(86) PCT No.: PCT/KR01/01640
§ 371 (c)(1),
(2), (4) Date: Jul. 30, 2003

(87) PCT Pub. No.: WO02/28204
PCT Pub. Date: Apr. 11, 2002

(65) Prior Publication Data
US 2004/0029844 A1 Feb. 12, 2004

(30) Foreign Application Priority Data

Sep. 30, 2000 (KR) .................. 2000-57652

(51) Int. Cl.
A61K 31/56 (2006.01)
A61K 31/23 (2006.01)
A61K 31/70 (2006.01)
A23L 2/02 (2006.01)
A23L 2/38 (2006.01)

(52) U.S. Cl. .......... 514/182; 514/27; 514/552; 514/785; 514/951; 424/439; 424/489; 426/590; 426/592; 426/599

(58) Field of Classification Search .................. 424/499; 426/590, 602–604, 611, 612; 514/99, 182
See application file for complete search history.

(56) References Cited

U.S. PATENT DOCUMENTS

| | | | |
|---|---|---|---|
| 3,881,005 A | 4/1975 | Thakkar et al. | 424/238 |
| 5,378,484 A | 1/1995 | Suwa et al. | |
| 5,502,045 A | 3/1996 | Miettinen et al. | 514/182 |
| 5,578,334 A | 11/1996 | Sundram et al. | 426/2 |
| 5,700,397 A | 12/1997 | Maeda et al. | |
| 5,914,149 A * | 6/1999 | Tomida | 426/590 |
| 5,932,562 A | 8/1999 | Ostlund, Jr. | 514/78 |
| 5,998,396 A | 12/1999 | Nakano et al. | |
| 6,054,144 A | 4/2000 | Burruano et al. | 424/464 |
| 6,110,502 A | 8/2000 | Burruano et al. | 424/499 |
| 6,190,720 B1 | 2/2001 | Yuan et al. | 426/601 |
| 6,242,001 B1 | 6/2001 | Bruce et al. | 424/464 |
| 6,267,963 B1 | 7/2001 | Akashe et al. | 424/195.1 |
| 6,267,964 B1 | 7/2001 | Nygren et al. | 424/197.11 |
| 6,352,737 B1 * | 3/2002 | Dolhaine et al. | 426/611 |
| 6,376,481 B1 * | 4/2002 | Bruce et al. | 514/169 |
| 6,387,411 B2 | 5/2002 | Bruce et al. | 424/489 |
| 6,423,363 B1 | 7/2002 | Traska et al. | 426/604 |
| 2002/0064548 A1 | 5/2002 | Yoon et al. | 424/439 |
| 2002/0156051 A1 * | 10/2002 | Kutney et al. | 514/99 |
| 2003/0113427 A1 | 6/2003 | Floter et al. | 426/601 |
| 2004/0013788 A1 | 1/2004 | Seki et al. | 426/601 |

FOREIGN PATENT DOCUMENTS

| | | |
|---|---|---|
| EP | 0 289 636 | 11/1988 |
| EP | 0 897 671 | 2/1999 |
| EP | 1 067 135 A2 | 1/2001 |
| EP | 1 142 494 | 10/2001 |
| EP | 0 947 197 B1 | 4/2004 |
| EP | 956 774 | 12/2007 |
| JP | 62-148424 | 8/1987 |
| JP | 2000-191684 | 7/2000 |
| JP | 2001-2697 | 1/2001 |
| KR | 93-11903 A | 7/1993 |
| KR | 94-50 A | 1/1994 |
| KR | 97-5921 B | 4/1997 |

(Continued)

OTHER PUBLICATIONS

Jens Birk Lauridsen, Food Emulsifiers: Surface Activity, Edibility, Manufacture, Composition, and Application, Journal of the American Oil Chemists' Society, 1976, 53, 400-407.*

(Continued)

*Primary Examiner* — John Pak
*Assistant Examiner* — Nathan W Schlientz
(74) *Attorney, Agent, or Firm* — Fish & Richardson P.C.

(57) ABSTRACT

Disclosed are a method for dispersing plant sterol for beverage and a plant sterol-dispersed beverage, of which particle size is nanometer-scale in dispersed beverage. The dispersion of plant sterols starts with the admixing of plant sterol to at least one emulsifier selected from the group consisting of sucrose fatty acid ester, sorbitan fatty acid ester and polyglycerine fatty acid ester, followed by melting the admixture by heating at 60 to 200° C. Afterwards, the molten substance is mixed with an aqueous beverage alone or an emulsifier-containing aqueous beverage in state of its own molten type or power type. This resulting mixture is stirred at a high speed to give a dispersion of plant sterols in an aqueous beverage. The beverage is superior in bioavailability, having good mouth feel, transparent aspect and no influence on the characteristic taste, flavor and color of the beverages.

26 Claims, No Drawings

FOREIGN PATENT DOCUMENTS

| KR | 99-196254 B | 2/1999 |
|---|---|---|
| KR | 2000-48814 A | 7/2000 |
| KR | 2002-26053 | 4/2002 |
| WO | 94/20072 | 9/1994 |
| WO | WO 99/15546 | 4/1999 |
| WO | WO 99/15547 | 4/1999 |
| WO | WO 00/33669 | 6/2000 |
| WO | WO 02/28204 | 4/2002 |
| WO | 02/065859 | 8/2002 |

OTHER PUBLICATIONS

G. Csoka, S. Marton, R. Zelko, N. Otomo and I. Antal, "Application of sucrose fatty acid esters in transdermal therapeutic systems." European Journal of Pharmaceutics and Biopharmaceutics, 2007, 65, 233-237.*

F.A. Husband, D.B. Sarney, M.J. Barnard and P.J. Wilde, "Comparison of foaming and interfacial properties of pure sucrose monolaurates, dilaurate and commercial preparations", Food Hydrocolloids, 1998, 12, 237-244.*

Mattson, F. H. et al., J Nutr 107: 1139-1146 (1977).

Mattson, F. H. et al., The American Journal of Clinical Nutrition 35: 697-700 (Apr. 1992).

Lees, A. M. et al., Atherosclerosis 28: 325-338 (1977).

M.S. Bosner et al., "Assessment of percent cholesterol absorption in humans with stable isotopes", J. of Lipid Reas., 34: 1047-1053 (1993).

International Search Report from PCT/KR02/00472, mailed Sep. 16, 2002.

International Preliminary Examination Report from PCT/KR01/01640, mailed Jan. 22, 2003.

International Preliminary Examination Report from PCT/KR02/000472, mailed Jul. 20, 2004.

Supplementary Search Report from EP 01 97 2780, mailed May 25, 2004.

Supplementary Search Report from EP 02 07 7307, mailed May 25, 2009.

International Search Report from PCT/KR01/01640, mailed Jan. 10, 2002.

* cited by examiner

METHOD FOR DISPERSING PLANT STEROL FOR BEVERAGE AND A PLANT STEROL-DISPERSED BEVERAGE, OF WHICH PARTICLE SIZE IS NANOMETER-SCALE IN DISPERSED BEVERAGE

TECHNICAL FIELD

The present invention relates to a method for dispersing plant sterol for beverage, and a plant sterol-dispersed beverage. More particularly, the present invention relates to a method for preparing a dispersion of plant sterol, in which plant sterol micelles are formed with a size of hundreds of nanometers or less and to a beverage containing the dispersion.

BACKGROUND ART

Recently, people have increasingly tendered to over-ingest cholesterol. As a result, diseases associated with cholesterol are increasingly becoming a big social problem. In particular, Eastern people, who have experienced westernization of their lifestyles, including their diet, have far more opportunities to consume high cholesterol foods than before on account of the deluge of instant or fast foods. When being ingested, the cholesterol of such foods increases the cholesterol level in blood and may act as a main cause of cardiovascular diseases, including hyperlipidemia, arteriosclerosis, arrhythmia, cardiac infarction, and so on.

Through studies of the metabolism of cholesterol, it has been shown that both endogenic and dietary cholesterol move into the small intestine and about 50% thereof is absorbed from the intestines (Bosner, M. S., Ostlund, R. E., Jr., Osofisan, O., Grosklos, J., Fritschle, C., Lange, L. G. 1993). Based on this fact, a mechanism for preventing cholesterol from being absorbed from intestines is of special interest to those who have made efforts to discover clues for the prophylaxis and treatment of cholesterol-associated diseases.

Plant sterol or phytosterol can be broken down into sitosterol, campesterol, and stigmasterol, while plant stanol or phytostanol comprises sitostanol and campestanol. For purposes of convenience, they are all called plant sterol herein.

With structures very similar to that of cholesterol, plant sterol is known to inhibit intestinal cholesterol absorption, thereby reducing the serum cholesterol level, as disclosed in U.S. Pat. No. 5,578,334. Being a naturally occurring material, plant sterol is non-toxic and can be found in a broad spectrum of plants such as bean, corn, wood, tall oil, etc. By taking advantage of the inhibitory function of plant sterol against intestinal cholesterol absorption, clinical trials have been conducted of plant sterol as a therapeutic agent for treatment of cardiovascular diseases, coronary artery diseases and hyperlipidemia (Atherosclerosis 28:325-338).

Despite this useful function, plant sterol is difficult to apply to foods on account of its physical properties, that is, very poor solubility in both water and oil. Accordingly, the general public can only limitedly ingest plant sterol.

With the aim of increasing the solubility of plant sterol, some researchers have synthesized various derivatives of plant sterol. For example, ester forms of plant sterol were developed, which have excellent solubility in oil phases (Mattson F. H., R. A. Volpenhein, and B. A. Erickson, 1997). In U.S. Pat. No. 5,502,045, sitostanol fatty acid ester is disclosed which is prepared by the interesterification of sitostanol with a fatty acid. According to this patent, the sitostanol fatty acid ester is reported to reduce the LDL-C level by as much is 16% when being used in an applied form in an oil phase (margarine).

WO 99/15546 and WO 99/15547 describe water- and oil-soluble plant sterol derivatives which are synthesized by linking a water- or oil-soluble molecule to plant sterol or plant stanol via an ester linkage.

However, a research result reveals that synthetic plant sterol derivatives with improved solubility have lower inhibitory effect on intestinal cholesterol absorption than does natural plant sterol (Mattson et al., The American Journal of Clinical Nutrition 35: April 1982 pp 697-700). Particularly, such oil-soluble derivatives are disadvantageous in that a lot of edible oil must also be ingested at the same time.

In addition to the effort to increase the solubility of plant sterol through the synthesis of derivatives, intensive research has been and continues to be directed to improving the bioavailability of plant sterol.

Much has been done with regard to this research. For instance, a pharmaceutical dispersible powder of sitosterols for oral administration was developed which can be prepared from a mixture of sitosterol, starch hydrolysate, silicon dioxide, and polyoxylene sorbitan monostearate in a certain proportion by homogenization, deaeration, pasteurization, and evaporation, as disclosed in U.S. Pat. No. 3,881,005.

Disclosed in U.S. Pat. No. 5,932,562 is an aqueous homogeneous micellar mix of a plant sterol, lecithin and lysolecithin which has been dried to a finely divided water soluble powder. This was obtained by mixing plant sterol lecithin and lysolecithin together in chloroform at a fixed molar ratio and removing the chloroform therefrom. In this patent however, some problems are inherent. The total amount of the emulsifiers used in the patent is greater than that of the plant sterol. The emulsifier lysolecithin is very expensive. What is worse, the organic solvent used to form the micelles makes the water-soluble powder unsuitable for ingestion.

Other water-soluble plant sterols can be found in U.S. Pat. Nos. 6,054,144 and 6,110,502. According to these patents, aqueous-dispersible plant sterol is produced by admixing oryzanol or plant sterol, a monofunctional surfactant and polyfunctional surfactant in water at fixed ratios, and drying the admixture. This production method is characterized by being free from homogenization and deaeration steps with adoption of polyoxylene sorbitan monopalmitate and sorbitan monopalmitate as a monofunctional surfactant and a polyfunctional surfactant, respectively.

In European Pat Publication No. 289,636 is described a method of producing emulsified or solubilized sterol in a stable form by admixing plant sterol at a fixed ratio with a liquid polyhydroxy compound containing sucrose fatty acid ester and/or polyglycerol fatty acid ester and diluting the admixture with water. When being applied to drinks, micelle particles of the plant sterol produced amount, in size, to as large as tens of micrometers, being bristly to the feel of the mouth. Furthermore, the micelle particles have the disadvantage of making the drinks opaque.

A food ingredient that can be used as a cholesterol-lowering agent is disclosed in U.S. Pat. No. 6,190,720. This patent also introduced the preparation of the food ingredient by combining one or more molten plant sterols with one or more fats and one or more emulsifiers to homogeneity and cooling the homogeneous mixture to about 60° C. under agitation to give a paste. This food ingredient can be applied to oil-based foods such as salad dressings, margarine, etc. As expected, the applicability of the food ingredient to aqueous beverages is virtually impossible because its dispersion stability is obtained only in fats.

EP 0 897 671 A1 is directed to aqueous dispersions of plant sterols useful in spreads, dressings, milk, cheese, etc., and to a preparation method comprising mixing together a molten high melting lipid, a non-sterol emulsifier and water under shear with a feature residing in that the high melting lipid has a mean size of 15 microns or less. The aqueous dispersions enjoy the advantage of permitting minimization or elimination of saturated fats and trans fatty acids. However, micronization of high melting lipids such as plant sterol must be conducted. In addition, the dispersion is not applied to aqueous beverages because of its low dispersion stability.

Cholesterol reducing, edible products can be found in WO 00/33669. According to the method of this patent, plant sterols are dissolved or mixed in a melt of a food emulsifier, admixed with proteineous foods such as milk or yogurt, homogenized, and added to food products. The dispersion stability of the cholesterol reducing, edible products is maintained only in the presence of a proteineous material, but not maintained in the absence of a proteineous material. Therefore, it is very difficult to apply the cholesterol reducing, edible products to beverages free of proteineous materials.

U.S. Pat. No. 6,267,963 is concerned with a plant sterol-emulsifier complex which has a melting temperature at least 30° C. below that of the plant sterol, characterized in that, due to its reduced melting temperature, the plant sterol-emulsifier is less likely to crystallize during or after the manufacture of food products and can be incorporated into food products in an amount effective to reduce serum cholesterol levels in a human consuming the food products without adversely modifying the texture of the food products. Prepared from plant sterols, emulsifiers, and neutral lipids such as triglycerides, the complex can be applied to oil-based food products. In the absence of neutral lipids, sodium stearoyl lactylate is employed as an emulsifier. However, the use of sodium stearoyl lactylate is limited by law. Additionally, its characteristic offensive odor requires a masking process when the complex is applied to beverages.

DISCLOSURE OF THE INVENTION

With the above problems in mind, the intensive and thorough research on the soluble form of plant sterols, conducted by the present inventors, resulted in the finding that, when plant sterol and an emulsifier are heated together in the absence of other components, they are brought into homogeneous contact with each other while being fused, to form fine micelles which are as small as nanometers in size, at subsequent high-speed stirring or homogenizing processes, leading to the present invention. It is also found that, in beverages, nanometer-scale micelles are superior in bioavailability, having no influence on the characteristic taste and flavor of the beverages, in addition to being applied to almost all beverages irrespective of beverage bases and pH, and the improvement in the dispersion stability of the plant sterol micelles has the effect of prolonging the life span of the beverage, guaranteeing the stability of the products for a long period of time.

Therefore, the object of the present invention is to provide a method of dispersing plant sterol in aqueous bases into a convenient form which is suitable for use in drinks and improved in the bioavailability of the plant sterol in addition to having no influence on the characteristic taste and flavor of the applied beverage.

It is another object of the present invention to provide a beverage containing a dispersion of plant sterol which is not bristly to the mouth.

It is a further object of the present invention to provide an additive suitable for use in beverages, which can be prepared by the method.

In accordance with one embodiment of the present invention, there is provided a method for dispersing plant sterol comprising the steps of thermally melting an admixture of plant sterol and at least one emulsifier at 60-200° C., said emulsifier being selected from the group consisting of sucrose fatty acid esters, sorbitan fatty acid esters and polyglycerine fatty acid esters; combining the molten mixture with an aqueous beverage or an emulsifier-containing aqueous beverage; and string the combination at a high speed to give a dispersion of plant sterol in the beverage, whereby the plant sterol can be dispersed into particles with a size of hundreds of nanometers.

In accordance with another embodiment of the present invention, there is provided a method for dispersing plant sterol, comprising the steps of: thermally melting an admixture of plant sterol and an emulsifier at 60-200° C., said emulsifier being selected from the group consisting of sucrose fatty acid esters, sorbitan fatty acid esters and polyglycerine fatty acid esters; combining the molten mixture with an aqueous beverage or an emulsifier-containing aqueous beverage; and stirring the combination at a high speed and homogenizing to give a plant sterol-dispersed beverage, whereby the plant sterol can be dispersed into particles with a size of hundreds of nanometers.

In accordance with a further embodiment of the present invention, there is provided a method for dispersing plant sterol, comprising the steps of thermally melting an admixture of plant sterol and at least one emulsifier at 60-200° C., said emulsifier being selected from the group consisting of sucrose fatty acid esters, sorbitan fatty acid esters and polyglycerine fatty acid esters; cooling the melt to a solid, pulverizing the solid to give a powder, and combining the powder with an aqueous beverage or an emulsifier-containing aqueous beverage; and stirring the combination at a high speed to give a plant sterol-dispersed beverage, whereby the plant sterol can be dispersed into particles with a size of hundreds of nanometers.

In accordance with still a further embodiment of the present invention, there is provided a method for dispersing plant sterol, comprising the steps of: thermally melting an admixture of plant sterol and at least one emulsifier at 60-200° C., said emulsifier being selected from the group consisting of sucrose fatty acid esters, sorbitan fatty acid esters and polyglycerine fatty acid esters; cooling the melt to a solid, pulverizing the solid to give a powder, and combining the powder with an aqueous beverage or an emulsifier-containing aqueous beverage; and stirring the combination at a high speed and homogenizing to give a plant sterol-dispersed beverage, whereby the plant sterol can be dispersed into particles with a size of hundreds of nanometers.

In accordance with still another embodiment, there is provided a plant sterol-dispersed beverage prepared by one of the above methods.

In accordance with still a further embodiment, there is provided an additive suitable for use in beverages, characterized in that it is prepared by thermally melting an admixture of plant sterol and at least one emulsifier at 60-200° C. and forms particles with a size of hundreds of nanometers or less when being dispersed in aqueous beverages, said emulsifier being selected from the group consisting of sucrose fatty acid esters, sorbitan fatty acid esters and polyglycerine fatty acid esters.

BEST MODES FOR CARRYING OUT THE INVENTION

Naturally occurring, plant sterols are similar in structure to cholesterol. In the natural world, there are found a variety of plant sterols, of which sitosterol, campesterol, stigmasterol and sitostanol predominate over other sterols. At an ordinary level of intake, plant sterols have little influence on the level of cholesterol in blood, but a large quantity of plant sterols inhibits the absorption of intestinal cholesterol and bile cholesterol on account of their structures being similar to that of cholesterol, thereby lowering the serum cholesterol level.

Effects of plant sterols on the reduction of serum cholesterol level have long been under study. Such studies have shown that plant sterols can reduce the total serum cholesterol level by 0.5-26%, especially the LDL-C level by 2-33%, depending on dosage, severity of patient's symptoms, and prescribed diet. The cholesterol level-reducing effect is also affected by the gender, age, and state of health of the patient, and its administration form (suspension, crystal, capsule, etc.).

Now, there is generally accepted the hypothesis that plant sterols effectively segregate dietary cholesterol, which remains in an oily phase within intestines, and settles it, thereby inhibiting the absorption of the dietary cholesterol from the intestines. Accordingly, plant sterols are believed to be ineffective against cholesterol which is in a micelle form. In fact, it is reported that dietary cholesterol is more resistant to absorption by plant sterols than is endogenic cholesterol (Mattson, F. H., Volpenhein, R. A., and Erickson, B. A, Effect of Plant Sterol Esters on the Absorption of Dietary Cholesterol, J. Nutr. 1977; 107:1139-1146). However, U.S. Pat. No. 5,932,562 performed an experiment with plant sterol, teaching that, when being administered even at a small amount, a micellar mix of plant sterol is very effective in reducing the serum cholesterol level. It is believed that a micelle phase of plant sterol well settles the cholesterol in a micelle phase to effectively inhibit its absorption by the intestine.

Products developed thus far which take advantage of plant sterols in reducing the level of cholesterol, especially LDL-cholesterol in blood, are commercially available in many countries such as Finland, England, United States of America, and Australia. They are mainly in forms of spreads or dressings in which plant sterols are bonded to fatty acids via ester linkages. These products are repotted to be more effective when being used in combination with statin drugs for hypercholesterolemia patients. However, the products contain fat components in large quantities, so that these are also ingested at the same time.

Many attempts have been made to provide plant sterols in beverage forms. However, because plant sterols are sparingly soluble in water, most of the beverage forms developed thus far suffer from the disadvantages of being poor in the bioavailability of plant sterols, lacking dose proportionality and employing large amounts of solubilizers. Additionally, it takes a significant period of time for conventional aqueous based forms of plant sterols to effect inhibition of cholesterol absorption on account of their slow utilization rate in vivo. Further, plant sterols show very poor dispersion stability, so that a drying process is required to remove the solubilizer used for dispersion of the plant sterols, such as water, to provide plant sterols in powder forms. To circumvent these problems, various solutions have been suggested, including pulverization of plant sterols into fine powders, addition of at least two different additives, and use of high-pressure homogenizers (5,000 psig).

As mentioned above, a variety of solubilizers and emulsifiers are employed to solubilize plant sterols. According to U.S. Pat. No. 5,932,562, sitosterol can be easily dispersed through formation of micelles from an organic solution of sitosterol. This process and the micellar mix thus obtained are unsuitable for application to beverages, which generally attach great importance to taste and flavor. For instance, large quantities of solubilizers or emulsifiers have an unfavorable influence on the taste of the final edible product. In addition, organic solvents, which are generally unsuitable for use in foods, may remain in the micelles.

Therefore, the present invention pertains to a method of dispersing plant sterols into micelles with a size of hundreds of nanometers, which improves the bioavailability of sparingly soluble plant sterols, has proper dose proportionality and shows a maximum of dispersion stability.

In accordance with the present invention, a great improvement is brought about in the bioavailability of plant sterols, giving rise to a decrease in their effective dosage. Further, a clear dispersion of plant sterols is obtained without affecting the characteristic taste and flavor of beverages of interest. When being applied, the micelles of the present invention are so small in particle size as not to be bristly to the mouth. Additional advantage of the present invention is that cholesterol-reducing beverages can be prepared irrespective of their pH and compositions.

Useful in the present invention is a plant sterol selected from the group consisting of sitosterol, campesterol, stigmasterol, sitostanol, campestanol and mixtures thereof. Additionally, other plants sterols can be used in the present invention.

Examples of the emulsifiers that can disperse plant sterols in a form of micelles with a size of hundreds of nanometers or less according to the dispersion method of the present invention, include sucrose fatty acid ester, sorbitan fatty acid ester, and polyglycerine fatty acid ester. Other emulsifiers than sucrose fatty acid ester, sorbitan fatty acid ester, and polyglycerine fatty acid ester were found to give significant amounts of particles with a size of 1 micrometer or larger as measured by various experiments. In practice, the other emulsifiers showed such low dispersion stability as to produce precipitates within three days after the dispersion of plant sterols therewith. Accordingly, the emulsifiers except for sucrose fatty acid ester, sorbitan fatty acid ester and polyglycerine fatty acid ester are virtually impossible to apply for the preparation of beverages. Excellent as sodium stearoyl lactylate is in dispersion stability, its use or amount is strictly prohibited by law because its safety is not guaranteed. Additionally, the emulsifier has its characteristic offensive odor.

By contrast, the emulsifiers used in the present invention allow plant sterols to be dispersed at a size of hundreds of nanometers or less. Further, their dispersion stability is so excellent as to maintain a 1% dispersion of plant sterols for one year or longer. Preferable among sucrose fatty acid esters are those that have a hydrophilic lipophilic balance (HLB) value of 7 or higher. Their HLB values are more preferably 10 to 16. Sorbitan fatty acid esters preferably have an HLB value of 5 to 11 and more preferably 7 to 10. As for polyglycerine fatty acid esters, their HLB values preferably range from 10 to 20 and more preferably from 12 to 15. Sucrose fatty acid esters produce smaller particles and more homogeneous particle size distribution than do the other emulsifiers, sorbitan fatty acid esters and polyglycerine fatty acid esters. In addition, these esters emit a little offensive odor. In consequence, sucrose fatty acid esters are most preferable.

In the dispersion of the present invention, the weight ratio of plant sterols to total emulsifiers is in the range of 1:0.01-10 and preferably in the range of 1:0.2-2.0 (w/w). For example, if the weight ratio of the emulsifier to plant sterol is below 0.01, sufficient emulsification is not achieved while precipitation occurs, and the emulsified particles, if formed, amount to as large as tens of micrometers in size. On the other hand, if the weight ratio exceeds 10, the resulting beverage acquires the taste of the emulsifier, being poor to the feel of the mouth. As for the emulsifier admixed with an aqueous beverage, it is used at a weight ratio of 0.8 or less compared with the emulsifier admixed with plant sterols (i.e., 80% by weight or less based on the weight of the emulsifier admixed with plant sterols) and preferably at a weight ratio of 0.5 or less (i.e., 80% by weight or less). A weight ratio of greater than 0.8 (w/w) (80% by weight) makes it difficult to form nanoparticles because the amount of the emulsifier admixed with plant sterol is relatively low.

Various aqueous beverages can be used in the present invention, as exemplified by water, juice beverages, carbonated drinks, milk, soy milk, drink made of grains, other popular drinks such as coffee, green tea, *Polygonatum odoratum* var. tea, and so on, and an alcohol drink.

In accordance with the present invention, plant sterol and an emulsifier are admixed at 60-200° C., Preferable heating temperatures of the admixture fall within the range of 120-150° C. When the admixing is conducted at less than 60° C., the micelle particles have a size of from tens to hundreds of micrometers, being poor to the feel of the mouth as well as in bioavailability. On the other hand, an admixing temperature higher than 200° C. denatures the emulsifier, though the plant sterol is still stable at a temperature of 250° C.

On the whole, when plant sterol a sparingly water-soluble substance, is emulsified in water in the presence of an emulsifier, only poor emulsification occurs, resulting in setting the plant sterol into particles with a size ranging from tens to hundreds of micrometers. In the present invention, intensive research was directed to maximizing the emulsification of plant sterol, thereby producing micelle particles with a size of hundreds of nanometers or less. As a result of the intensive research, it was found that emulsification could be maximized when plant sterol and an emulsifier such as sucrose fatty acid esters, sorbitan fatty acid esters, polyglycerin fatty acid esters, or its mixtures was mixed to the homogeneity. In order to homogeneously mix plant sterol with an emulsifier, the plant sterol is heated at near its melting point (sitosterol: about 140° C.; campesterol: about 157° C., stigmasterol: about 170° C.) to bring the two components into liquid phases before mixing.

Together with an aqueous beverage or an emulsifier-containing aqueous beverage, the heated admixture of plant sterol and emulsifier is stirred at a high speed. The emulsifier added to the aqueous beverage is preferably identical to that admixed with the plant sterol. However, a different one may be used if they are compatible with each other. The weight ratio of the plant sterol to the aqueous beverage falls within the range of 1:10 to 1:10,000 (w/w) and preferably within the range of 1:10 to 1:100 (w/w).

Examples of aqueous beverages usable in the present invention include water, juice beverages, carbonated drinks, milk, soy milk, drinks made of grains, other popular drinks such as coffee, tea, and so on, and alcoholic beverages, with a preference for water. In case that water is employed, the dispersion of plant sterol obtained by subsequent high-speed stirring and homogenizing processes may be further diluted with aqueous beverages such as water, juice beverages, carbonated drinks, soy milk, drinks made of grains, other popular drinks, and an alcohol drink to afford desired plant sterol-containing beverages.

Resulting in homogenous particle size distribution, the high-speed stirring or homogenizing process is industrially important in terms of constant quality of products.

Alternatively, plant sterol may be admixed with an emulsifier and heated at near the melting point thereof, and the melt is cooled to give a solid which is then pulverized into powder. By simply adding the powder to aqueous beverages or emulsifier-containing beverages; plant sterol-containing beverages can be prepared. Over liquid forms, therefore, powder forms of additives have advantages in that they are convenient to handle, more safe to microorganism contamination during transportation, and easy to transport with low logistics cost.

When water is employed as an aqueous substrate, the dispersion obtained after the admixture of plant sterol and emulsifier is dispersed in water, is evaporated and freeze-dried or spray-dried to produce an aqueous plant sterol powder. Then the powder is applied to aqueous beverages to provide plant sterol-containing beverages.

An admixture of plant sterol and sucrose fatty acid ester, which is obtained by heating before mixing, is added to water, after which a stirring process and a high-pressure homogenizing process are conducted in due order to give a clear plant sterol dispersion. When plant sterol is used at an amount of 1%, conventional emulsification processes cannot guarantee the dispersion stability of the resulting solution, giving rise to an increase in settling of plant sterol. While conventional emulsification processes produce dispersions which show a transmittance at 700 nm of as low as 0.16%, the method according to the present invention promises a transmittance at 700 nm of 80.0% or higher.

With regard to the mixing of the admixture of plant sterol and emulsifier with the aqueous beverage, the admixture of plant sterol and emulsifier may be added to the aqueous beverage in the form of a hot liquid phase or a solid phase cooled to room temperature. In the former case, the aqueous beverage is heated to 60-140° C. and preferably to 70-90° C. in order to enhance the emulsification efficiency. Optimal for the direct application of the liquid phase of the admixture to beverages is 80° C. Particularly, the heating temperature of the aqueous beverage is preferably set to be similar to that of the admixture of plant sterol and emulsifier in order to make the micelle particles small. Upon emulsification in water, pressure is needed to raise the temperature to higher than 100° C. For example, about 5 atm is required to emulsify the plant sterol admixture in water at 140° C.

After stirring the mixture, nanoparticles are formed. In this regard, the stirring is conducted at 5,000-10,000 rpm and preferably at 6,500-7,500 rpm for about 10 min. 90% or more of the micelles obtained after the stirring process were measured to be 300 nm or less in size. In contrast, the micelles obtained under the same conditions, except that the admixture of plant sterol and emulsifier is not heated, were measured to range, in particle size, from tens to hundreds of micrometers. Therefore, these comparative measurements demonstrate that the process of melting plant sterol and an emulsifier and mixing them is very important in forming nanoparticles. In addition, a high-speed string or homogenizing process is important in making particles homogenous in size as will be described later.

Upon heating in the absence of other components, the plant sterol and an emulsifier can be brought into homogeneous contact with each other while being melted, so that the micelles are obtained with a size of hundreds of nanometers after the emulsification. Contrary to conventional techniques, the present invention is, therefore, capable of producing nanoparticles suitable for use in beverages without using any organic solvents in which plant sterol is fairly soluble.

After the stirring process, a homogenizing process is needed to pulverize aggregated micelles. This homogenizing process may be conducted with the aid of a high-pressure homogenizer, a colloid mill or a sonicator with a preference for a high-pressure homogenizer. In accordance with the present invention, the micelles are homogenized at a pressure of 2,000-25,000 psi and preferably at a pressure of 7,000-10,000 psi in a homogenizer. After this process, 95% or more of the micelles thus obtained were measured to be 300 nm or less in size.

The dispersion, which is obtained by thermally melting plant sterol and an emulsifier, admixing them, stirring the admixture in water and treating under high pressure in accordance with the present invention, is diluted with juice beverages, carbonated drinks, milk, soy milk, drinks made of grains, or other popular drinks to afford desired plant sterol-containing beverages. In these beverages, the micelles with a particle size as small as nanometers have large surface areas and particle curvatures and are superior in bioavailability, having no influence on the characteristic taste and flavor of the beverage.

Additionally, the beverages according to the present invention do not undergo layer separation even after being stored in a refrigerator because the plant sterol micelles are improved in dispersion stability. Further, the plant sterol micelles maintain excellent dispersion stability at 90° C., guaranteeing the stability of the products for a long period of time.

A better understanding of the present invention may be obtained in light of the following examples which are set forth to illustrate, but are not to be construed to limit the present invention. In the following examples, particle size distribution was analyzed by use of Mastersizer (Malvern Instrument LTD., UK).

Comparative Example 1

To one liter vessel was added 500 g of water which was then heated to about 80° C. 5 g of plant sterol (sitosterol 75%, campesterol 10%, stigmasterol sitostanol 15%) and 4.25 g of sucrose stearate ester (HLB 11) were added to the hot water, followed by stirring the mixture at a speed of 6,800-7,000 rpm for 10 mm. The particles thus obtained were analyzed for size and the results are given in Table 1, below.

TABLE 1

| Particle size(μm) | Cumulative % |
|---|---|
| 0.985 | 0.07 |
| 1.89 | 12.41 |
| 2.50 | 32.52 |
| 3.31 | 53.23 |
| 4.38 | 66.82 |
| 5.27 | 77.28 |
| 6.35 | 85.32 |
| 11.11 | 95.69 |
| 21.32 | 98.96 |
| 78.56 | 100.00 |

Comparative Example 2

The dispersion prepared in Comparative Example 1 was treated at 7,000 psi with a high-pressure homogenizer, such as that manufactured by Microfluidics, identified as "Microfluidizer M110EHI", in one pass. The particles thus obtained were analyzed for size and the results are given in Table 2, below. The resulting dispersion was measured to have a transmittance at 700 nm of 0.16%.

TABLE 2

| Particle Size(μm) | Cumulative % |
|---|---|
| 0.985 | 0.03 |
| 1.89 | 11.25 |
| 2.50 | 30.43 |
| 3.31 | 54.47 |
| 4.38 | 66.55 |
| 5.27 | 79.74 |
| 6.35 | 88.45 |
| 11.11 | 96.21 |
| 21.32 | 99.46 |
| 94.65 | 100.00 |

Comparative Example 3

In one liter vessel, 40 g of plant sterol (sitosterol 75%, campesterol 10%, stigmasterol sitostanol 15%), 36 g of plant oil, and 4 g of polysolvate 60 (HLB 14.9) were melted at 130-140° C. to the clearness with stirring. After the completion of the melting, the clear melt was added with 320 g of water maintained at about 80° C., followed by stirring at about 10,000 rpm for about 10 min. The plant sterol dispersion thus obtained was observed to have floating plant sterol particles while numerous particles appeared to be clinging to the wall of the vessel. As a result of the analysis of the dispersion for particle size distribution (in volume), 91% or more of the total population was 1 μm or more in size and about 81% or more of the total population was 100 μm or more in size. In addition, precipitation and phase separation were observed within one hour at room temperature, ensuring that this plant sterol dispersion cannot be applied to beverages.

Comparative Example 4

In one liter vessel, 15 g of plant sterol (sitosterol 75%, campesterol 10%, stigmasterol sitostanol 15%) and 30 g of citric acid monoglycerine ester (HLB 8.0) were melted at 130-140° C. to the clearness with stirring. Thereafter, the clear melt was added with water maintained at about 80° C., followed by stirring at about 6,800 rpm for about 10 nm. The resulting solution was treated at 10,000 psi with a high-pressure homogenizer, such as that manufactured by Microfluidics, identified as "Microfluidizer M110EHI", in one pass. In the plant sterol thus obtained, numerous particles were clearly observed to cling onto the wall of the vessels because the plant sterol dispersion was not combined with protein, but with water. At a plant sterol concentration of 1%, the dispersion had a viscosity of as high as 58 cps. As a result of the analysis of the dispersion for particle size distribution (in volume), the dispersion was measured to have particles with a size of 1 μm or larger at a cumulative percentage of 68% or more, and with a size of 10 μm or larger at a cumulative percentage of 21% or more, which was large enough to provide a bristly feel to the mouth. In addition, its poor dispersion stability led to the conclusion that this dispersion is difficult to apply for the preparation of beverages.

Comparative Example 5

In one liter vessel, 15 g of plant sterol (sitosterol 75%, campesterol 10%, stigmasterol sitostanol 15%) and 15 g of sodium stearoyl lactylate (SSL) were melted at 130-140° C. to the clearness with stirring. Thereafter, the clear melt was added with 300 g of water maintained at about 80° C., followed by stirring at about 6,800 rpm for about 10 min. The resulting solution was treated at 10,000 psi with a high-pressure homogenizer, such as that manufactured by Microfluidics, identified as "Microfluidizer M110EHI", in one pass. The plant sterol dispersion was observed to undergo precipitation within one day and complete solidification within three days, which results led to the conclusion that this dispersion is difficult to apply for the preparation of beverages. As a result of the analysis of the dispersion for particle size distribution (in volume), the dispersion was measured to have particles with a size of 1 μm or larger at a cumulative percentage of 57% or more and with a size of 10 μm or larger at a cumulative percentage of 17% or more. Such a poor dispersion stability led to the conclusion that this dispersion is difficulty to apply for the preparation of beverages.

Example 1

In a vessel, plant sterol (sitosterol 75%, campesterol 10%, stigmasterol sitostanol 15%) and sucrose stearyl ester (HLB 11) and/or sorbitan lauryl ester (HLB 8.6) were melted at 130-140° C. with stirring. After completion of the melting, the solution was stirred further for 1 min and added to water maintained at about 80° C., followed by siring at 6,800-7,000 rpm for about 10 min. The resulting solution was treated at 7,000 psi with a high-pressure homogenizer (Microfluidizer M110EHI, Microfluidics) in one pass. Table 3 lists the amounts of plant sterol, sucrose stearyl ester, and sorbitan lauryl ester used, specifying whether a high-pressure homogenizing process was carried out or not.

TABLE 3

| No. | Plant Sterol | Sucrose stearyl Ester | Sorbitan lauryl ester | $H_2O$ | High pressure Homogenization |
|---|---|---|---|---|---|
| 1 | 5 g | 4.25 g | — | 500 g | Not done |
| 2 | 5 g | 4.25 g | — | 500 g | Done |
| 3 | 5 g | 3.036 g | 1.214 g | 500 g | Not done |
| 4 | 5 g | 3.036 g | 1.214 g | 500 g | Done |
| 5 | 25 g | 2.5 g | 1.75 g | 500 g | Not done |
| 6 | 25 g | 2.5 g | 1.75 g | 500 g | Done |
| 7 | 25 g | 2.126 g | 2.124 g | 500 g | Not done |
| 8 | 25 g | 2.126 g | 2.124 g | 500 g | Done |

The solution of No. 1 in Table 3 was analyzed for particle size distribution and the results are given in Table 4, below.

TABLE 4

| Particle Size(μm) | Cumulative % |
|---|---|
| 0.096 | 20.35 |
| 0.127 | 52.19 |
| 0.153 | 68.49 |
| 0.184 | 75.29 |
| 0.222 | 85.33 |
| 0.294 | 91.52 |
| 0.985 | 99.21 |
| 5.27 | 100.0 |

For purposes of reference, analysis results of the particles of Nos. 3, 5 and 7 in Table 3 were similar to those of No. 1 shown in Table 4.

In the case of No. 2 in Table 3, the analysis results of the particle are given in Table 5, below.

TABLE 5

| Particle Size(μm) | Cumulative % |
|---|---|
| 0.096 | 13.67 |
| 0.127 | 49.40 |
| 0.153 | 69.39 |
| 0.184 | 77.61 |
| 0.222 | 89.07 |
| 0.294 | 95.22 |
| 0.985 | 99.89 |
| 2.08 | 100.0 |

For purposes of reference, analysis results of the particles of Nos. 4, 6 and 8 in Table 3 were similar to those of No. 2 shown in Table 5.

The plant sterol dispersions prepared in Example 1 (Nos. 2, 4, 6, and 8) were measured to range, in transmittance at 700 nm, from 80.0 to 80.5%.

Example 2

In a vessel, plant sterol (sitosterol 75%, campesterol 10%, stigmasterol sitostanol 15%) and sucrose stearyl ester (HLB 11) and/or sorbitan lauryl ester (HLB 8.6) were melted at 130-140° C. with stirring. After completion of the melting, the solution was stirred further for 1 min and added to water (80-90° C.) containing 1 g of sucrose stearyl ester, followed by stirring at 6,800-7,000 rpm for about 10 min. The resulting solution was treated at 7,000 psi with a high-pressure homogenizer (Microfluidizer M110EHI, Microfluidics) in one pass. Table 6 lists the amounts of plant sterol, sucrose stearyl ester, and sorbitan lauryl ester used, specifying whether a high-pressure homogenizing process was performed or not.

TABLE 6

| No. | Plant Sterol | Sucrose stearyl ester | Sorbitan lauryl ester | $H_2O$ | High-pressure Homogenization |
|---|---|---|---|---|---|
| 9 | 5 g | 4.25 g | — | 500 g | Not done |
| 10 | 5 g | 4.25 g | — | 500 g | Done |
| 11 | 5 g | 3.036 g | 1.214 g | 500 g | Not done |
| 12 | 5 g | 3.036 g | 1.214 g | 500 g | Done |
| 13 | 25 g | 2.5 g | 1.75 g | 500 g | Not done |
| 14 | 25 g | 2.5 g | 1.75 g | 500 g | Done |
| 15 | 25 g | 2.126 g | 2.124 g | 500 g | Not done |
| 16 | 25 g | 2.126 g | 2.124 g | 500 g | Done |

The solution of No. 9 in Table 6 was analyzed for particle size and the results are given in Table 7, below.

TABLE 7

| Particle Size(μm) | Cumulative % |
|---|---|
| 0.096 | 19.21 |
| 0.127 | 52.30 |
| 0.153 | 68.72 |
| 0.184 | 76.41 |
| 0.222 | 85.95 |
| 0.294 | 92.05 |
| 0.985 | 99.35 |
| 4.80 | 100.0 |

For purposes of reference, analysis results of the particles of Nos. 11, 13 and 15 in Table 6 were similar to those of No. 9 shown in Table 7.

In the case of No. 10 in Table 6, the analysis results of the particle are given in Table 8, below.

TABLE 8

| Particle Size(μm) | Cumulative % |
|---|---|
| 0.096 | 14.50 |
| 0.127 | 48.24 |
| 0.153 | 70.68 |
| 0.184 | 77.92 |
| 0.222 | 90.61 |
| 0.294 | 96.74 |
| 0.985 | 99.85 |
| 1.89 | 100.0 |

For purposes of reference, analysis results of the particles of Nos. 12, 14 and 16 in Table 6 were similar to those of No. 10 shown in Table 8.

The plant sterol dispersions prepared in Example 2 (Nos. 10, 12, 14, and 16) were measured to range, in transmittance at 700 nm, from 80.5 to 82.5%.

Example 3

In a vessel, 5 g of plant sterol (sitosterol 75%, campesterol 10%, stigmasterol sitostanol 15%) and 4.25 g of polyglycerine monostearate (HLB 12) were melted at 130-140° C. with stirring. After completion of the melting, the melt was stirred further for 1 min and added to 490.75 g of water heated to 80° C., followed by stirring at 6,800-7,000 rpm for about 10 min. The resulting solution was treated at 7,000 psi with a high-pressure homogenizer (Microfluidizer M110EHI, Microfluidics) in one pass.

Results from particle size analysis before the high-pressure homogenization were the same as in Table 4 within allowable experimental errors.

The same results as in Table 5 were found in the particle size analysis, within allowable experimental errors, after the high-pressure homogenization.

The plant sterol dispersion after the high-pressure homogenization was measured to range, in transmittance at 700 nm, from 80.0 to 80.5%.

Example 4

In a vessel, 5 g of plant sterol (sitosterol 75%, campesterol 10%, stigmasterol sitostanol 15%) and 3.25 g of polyglycerine monostearate (HLB 12) were melted at 130-140° C. with sing. After completion of the melting, the melt was stirred further for 1 min and added to 491.25 g of water (80-90° C.) containing 1 g of polyglycerine monostearate, followed by siring at 6,800-7,000 rpm for about 10 min. The resulting solution was treated at 7,000 psi with a high-pressure homogenizer (Microfluidizer M110EHI, Microfluidics) in one pass.

Results from particle size analysis before the high-pressure homogenization were the same as in Table 7 within allowable experimental errors.

The same results as in Table 8 were found in the particle size analysis, within allowable experimental errors, after the high-pressure homogenization.

The plant sterol dispersion after the high-pressure homogenization was measured to range, in transmittance at 700 nm, from 80.5 to 82.5%.

Example 5

The dispersions prepared in Examples 1 to 4 were spray-dried to give aqueous plant sterol powder.

Example 6

100 g of the dispersion prepared in each of Examples 1 to 4 was diluted with 400 g of an aqueous beverage selected from the group consisting of water, juice beverages, carbonated drinks, milk, soy milk, drinks made of grains, and other popular drinks. 9.25 g of the powder prepared in Example 5 was added to 490.75 g of an aqueous beverage selected from the group consisting of water, juice beverages, carbonated drinks, milk, soy milk, drinks made of grains, and other popular drinks. The resulting diluted beverage was taken by 50 skilled subjects (20 males in thirties and forties, 20 females in thirties and forties, 10, unmarried females) for property test by sense perception. As a test beverage, a juice beverage (orange juice) was used. The results are given in Tables 9 and 10, below.

TABLE 9

Overall Test

|  | Better than Conventional juice | As good as Conventional juice | Poorer than Conventional juice |
|---|---|---|---|
| No. of persons | 9 | 40 | 1 |
| Percentage | 18% | 80% | 2% |

TABLE 10

Taste Test

| Perception | Strongly agree | Agree | Neutral | Disagree | Strongly disagree |
|---|---|---|---|---|---|
| Sour | 2 | 6 | 30 | 11 | 1 |
| Sweet | 1 | 3 | 43 | 2 | 1 |
| Bitter | 0 | 1 | 2 | 5 | 42 |
| Bristly feel | 0 | 0 | 0 | 3 | 47 |

When testing other beverages, results similar to those of Tables 9 and 10 were obtained.

Example 7

The beverage prepared in Example 6 was stored for 1 year or longer in a refrigerator (4° C.). Separately, the same beverage was treated at 90° C. for 4 hours. Not only were the beverages observed to maintain a normal dispersion state, but also no other abnormality was detected.

Example 8

In a vessel, 5 g of plant sterol and 4.25 g of sucrose stearyl ester (HLB 11) were placed and then melted at 130-140° C. with sting. After completion of the melting, stirring was further conducted for 1-2 min. To the solution thus obtained was added 490.75 g of an aqueous beverage selected from the group consisting of water, juice beverages, carbonated drinks, milk soy milk, drinks made of grains, and other popular drinks. The diluted beverage was taken by 50 skilled subjects (20 males in thirties and forties, 20 females in thirties and forties, 10 unmarried females) for property test by sense perception. As a test beverage, a juice beverage (orange juice) was used. The results are given in Tables 11 and 12, below.

TABLE 11

Overall Test

| | Better than Conventional juice | As good as Conventional juice | Poorer than Conventional juice |
|---|---|---|---|
| No. of persons | 6 | 42 | 2 |
| Percentage | 12% | 84% | 4% |

TABLE 12

Taste Test

| Perception | Strongly agree | Agree | Neutral | Disagree | Strongly Disagree |
|---|---|---|---|---|---|
| Sour | 3 | 5 | 31 | 10 | 1 |
| Sweet | 1 | 3 | 43 | 2 | 1 |
| Bitter | 0 | 1 | 3 | 4 | 42 |
| Bristly feel | 0 | 0 | 1 | 4 | 45 |

When other beverages were tested, results similar to those of Tables 11 and 12 were obtained.

Example 9

In a vessel, 5 g of plant sterol (melting point: 143° C.) and 4.25 g of sucrose stearyl ester (HLB 11) were melted at 130-140° C. with stirring. After completion of the melting, stirring was conducted, further for 1-2 min. The homogenous melt thus obtained was cooled to room temperature to give a solid which was then pulverized into powder.

Example 10

The powder prepared in Example 9 was found to have a melting point of 125° C. as measured by a melting point measuring instrument (Electrothermal 9200).

Example 11

9.25 g of the powder prepared in Example 5 or 9 was added to 90.75 g of water heated up to 80-90° C. with stirring at 6,800 to 7,000 rpm for 10 min.

Example 12

The solution prepared in Example 11 was processed at 7,000 psi with a high-pressure homogenizer (Microfluidizer M110EHI, Microfluidics) in one pass.

Example 13

100 g of the dispersion prepared in Example 11 or 12 was diluted with 400 g of an aqueous beverage selected from the group consisting of water, juice beverages, carbonated drinks, milk, soy ilk, drinks made of grains, and other popular drinks.

Example 14

9.25 g of the powder prepared in. Example 5 or 9 was added to 490.75 g of an aqueous beverage selected from the group consisting of water, juice beverages, carbonated drinks, milk soy milk drinks made of grains, and other popular drinks, and the dispersion was stirred at 6,800 to 7,000 rpm for about 10 min.

Example 15

The beverage prepared in Example 14 was processed at 7,000 psi with a high-pressure homogenizer (Microfluidizer M110EHI, Microfluidics) in one pass.

Example 16

The beverages prepared in Examples 14 and 15 were stored at room temperature for 1 year or longer, in a refrigerator (4° C.) for 1 year or longer, and at 90° C. for 4 hours with monitoring for physical states. Not only were the beverages observed to maintain a normal dispersion state, but also no other abnormality was detected.

Example 17

Clinical Test

A beverage for clinical tests was obtained by combining the dispersion of No. 2 of Example 1 with coffee, milk, or green tea, according to the method of Example 4.

1. Clinical Subjects: 45 Persons Suffering from Slight Hyperlipidemia

TABLE 13

| Conditions of Clinical Subjects Before Test | |
|---|---|
| Gender (male:female) | 15:30 |
| Age (year) | 56.53 ± 10.28 |
| Body Mass Index (BMI) (kg/m$^2$) | 25.14 ± 2.51 |
| Percent Ideal Body Weight (PIBW) | 119.20 ± 12.60 |
| Total Serum Cholesterol (mg/L) | 246.12 ± 27.61 |
| Neutral Lipid (mg/L) | 145.81 ± 57.43 |
| LDL-Cholesterol (mg/L) | 161.90 ± 19.35 |
| HDL-Cholesterol (mg/L) | 52.89 ± 12.54 |

2. Diet Control for Clinical Subjects: No Special Diets; Low Cholesterol Diet was Provided for Patients Ailing with Slight Hyperlipidemia

TABLE 14

| Diet Conditions for Clinical Subjects | |
|---|---|
| Total Calories (Cal) | 1705.9 ± 330.49 |
| Protein (g) | 64.26 ± 18.53 |
| Total Lipid (g) | 40.12 ± 17.26 |
| Saturated Lipid (g) | 11.12 ± 6.13 |
| Cholesterol (mg) | 135.82 ± 80.13 |

3. Prescription
Used for this clinical test was green tea or coffee containing 1.6 g of plant sterol per test bottle.
3-1 Test Group 1
Step 1: 1 bottle of the beverage per day from week 0 to 4
Step 2: 2 bottles of the beverage per day from week 5 to 8
Step 3: 1 bottle of a placebo per day from week 9 to 12
3-2 Test Group 2
Step 1: 1 bottle of a placebo per day from week 0 to 4
Step 2: 1 bottle of the beverage per day from week 5 to 8
Step 3: 2 bottles of the beverage per day from week 9 to 12
4. Results
45 persons (male:female=15:30, Avg. Age: 56) completely followed the instructions and conditions of the clinical test. At the beginning time, the clinical subjects were measured to ingest 11.12 g of saturated fat and 135.8 mg of cholesterol in daily mean diet. In both the placebo-ingesting test group and the 8-week plant sterol-ingesting test group, therapeutic effects were observed in terms of total serum cholesterol (p=0.039) and LDL-cholesterol (p=0.036). In these groups, the period effect and carry-over effect for serum lipid levels (total cholesterol, neutral lipid, HDL-cholesterol, LDL-cholesterol) were not statistically significant. After ingesting plant sterol for 8 weeks, the patients were measured to be decreased in total serum cholesterol level by 4.38% (=0.039) and in LDL-cholesterol level by 8.28% (p=0.036). Of the clinical subjects, 33 persons were decreased in total cholesterol level by 9.2% on average while 31 persons were decreased in LDL-cholesterol level by 14.1% on average.

5. Conclusion

Hypercholesterolemia patients could enjoy the reduction in total serum cholesterol level and LDL-cholesterol level when ingesting the plant sterol-containing beverage of the present invention for 8 weeks. This reduction effect wag obtained from the patents who had taken low dietary cholesterol.

INDUSTRIAL APPLICABILITY

As described hereinbefore, plant sterol nanoparticles are formed by thermally melting plant sterol and at least one emulsifier selected from the group consisting of sucrose fatty acid esters, sorbitan fatty acid esters, and polyglycerine fatty acid esters and dispersing the molten mixture in an aqueous substrate, in accordance with the present invention. The plant sterol-containing beverage of the present invention inhibits the absorption of intestinal cholesterol and bile cholesterol, to lower the serum cholesterol level. In accordance with the present invention, micelles of plant sterol can be formed in a size of hundreds of nanometers or less without using organic solvents and thus can be applied to aqueous beverages. Since the present plant sterol micelles are formed with a size of hundreds of nanometers or less, the micelles are superior in bioavailability. Additionally, the improvement in the dispersion stability of the plant sterol micelles has the effect of prolonging the life span of the beverage, guaranteeing the stability of the products for a long period of time. Further, the micelles can be applied to almost all beverages irrespective of beverage bases and pH. Having no influence on the characteristic taste and flavor of the beverages, the micelles provide good mouth feel enough to be applied to all kinds of aqueous beverages.

The invention claimed is:

1. A method for dispersing plant sterol, comprising the steps of:
thermally melting an admixture consisting of plant sterol and at least one sucrose fatty acid ester emulsifier at 60-200° C., said sucrose fatty acid ester emulsifier having a hydrophilic-lipophilic balance value of 10 to 16;
combining the molten mixture with an aqueous beverage or an emulsifier-containing aqueous beverage; and
stirring the combination at a speed of 5,000 to 10,000 rpm to give a dispersion of plant sterol in the beverage, wherein when said aqueous beverage is water, said dispersion has a transmittance at 700 nm of 80.0% or greater,
whereby the plant sterol is dispersed into particles, wherein 90% or more of the particles have a size of 300 nanometers or less.

2. A method for dispersing plant sterol, comprising the steps of thermally melting an admixture consisting of plant sterol and at least one sucrose fatty acid ester emulsifier at 60-200° C. said sucrose fatty acid ester emulsifier having a hydrophilic-lipophilic balance value of 10 to 16;
combining the molten mixture with an aqueous beverage or an emulsifier-containing aqueous beverage; and
stirring the combination at a speed of 5,000 to 10,000 rpm and homogenizing to give a plant sterol-dispersed beverage, wherein when said aqueous beverage is water, said plant sterol-dispersed beverage has a transmittance at 700 nm of 80.0% or greater, whereby the plant sterol is dispersed into particles, wherein 90% or more of the particles have a size of 300 nanometers or less.

3. A method for dispersing plant sterol, comprising the steps of:
thermally melting an admixture consisting of plant sterol and at least one sucrose fatty acid ester emulsifier at 60-200° C., said sucrose fatty acid ester emulsifier having a hydrophilic-lipophilic balance value of 10 to 16;
cooling the melt to a solid, pulverizing the solid to give a powder;
combining the powder with an aqueous beverage or an emulsifier-containing aqueous beverage; and
stirring the combination at a speed to give a plant sterol-dispersed beverage, wherein when said aqueous beverage is water, said plant sterol-dispersed beverage has a transmittance at 700 nm of 80.0% or greater,
whereby the plant sterol is dispersed into particles, wherein 90% or more of the particles have a size of 300 nanometers or less.

4. A method for dispersing plant sterol, comprising the steps of:
thermally melting an admixture consisting of plant sterol and at least one sucrose fatty acid ester emulsifier at 60-200° C., said sucrose fatty acid ester emulsifier having a hydrophilic-lipophilic balance value of 10 to 16;
cooling the melt to a solid, pulverizing the solid to give a powder, and combining the powder with an aqueous beverage or an emulsifier-containing aqueous beverage; and
stirring the combination at a speed of 5,000 to 10,000 rpm and homogenizing to give a plant sterol-dispersed beverage, wherein when said aqueous beverage is water, said plant sterol-dispersed beverage has a transmittance at 700 nm of 80.0% or greater,
whereby the plant sterol is dispersed into particles, wherein 90% or more of the particles have a size of 300 nanometers or less.

5. The method as set forth in any one of claims 1 to 4, wherein 95.0% or more of the particles have a size of 300 nanometers or less.

6. The method as set forth in claim 5, wherein 99.0% or more of the particles have a size of 300 nanometers or less.

7. The method as set forth in claim 1 or 2, further comprising the step of drying the dispersion to produce aqueous plant sterol powder.

8. The method as set forth in claim 7, wherein the drying step comprises evaporating or freeze-drying or spray-drying.

9. The method as set forth in any one of claims 1 to 4, wherein the plant sterol is at least one selected from the group consisting of sitosterol, campesterol, stigmasterol, sitostanol and campestanol.

10. The method as set forth in claim 9, wherein the plant sterol is sitosterol.

11. The method as set forth in any of claims 1 to 4, wherein the stirring step is conducted at a speed of 6,500 to 7,500 rpm.

12. The method as set forth in any one of claims 1 to 4, wherein the aqueous beverage is water, a juice beverage, a carbonated drink, milk, soy milk, a drink made of grains, or an alcohol drink.

13. The method as set forth in claim 12, wherein the aqueous beverage is water.

14. The method as set forth in any one of claims 1 to 4, wherein the melting step is carried out at 120-150° C.

15. The method as set forth in any one of claims 1 to 4, wherein the plant sterol is mixed at a weight ratio of 1:0.01-10 with the sucrose fatty acid ester emulsifier in total.

16. The method as set forth in claim 15, wherein the plant sterol is mixed at a weight ratio of 1:0.2-2.0 with the sucrose fatty acid ester emulsifier in total.

17. The method as set forth in claim 1 or 2, wherein the molten mixture is combined with an emulsifier-containing beverage, wherein the emulsifier in the emulsifier-containing beverage is 80% by weight or less based on the weight of the sucrose fatty acid emulsifier in said admixture.

18. The method as set forth in any one of claims 1 to 4, wherein the plant sterol is mixed at a weight ratio of 1:10-10,000 (w/w) with the aqueous beverage.

19. The method as set forth in claim 8, wherein the plant sterol is mixed at a weight ratio of 1:10-100 (w/w) with the aqueous beverage.

20. The method as set forth in any one of claims 1 to 4, wherein the admixture of the aqueous beverage and the plant sterol is maintained at 60-140° C.

21. The method as set forth in claim 20, wherein the admixture is maintained at 70-90° C.

22. The method as set forth in claim 2 or 4, wherein the homogenizing step is carried out by use of a high-pressure homogenizer, a colloid mill or a sonicator.

23. The method as set forth in claim 22, wherein the homogenizing step is carried out by use of a high-pressure homogenizer.

24. The method as set forth in claim 23, wherein the high-pressure homogenizer is operated at 2,000-25,000 psi.

25. The method as set forth in claim 24, wherein the high-pressure homogenizer is operated at 7,000-10,000 psi.

26. The method as set forth in claim 3 or 4, wherein the powder is combined with an emulsifier-containing beverage, which emulsifier-containing beverage is formed by admixing said emulsifier with the aqueous beverage at an amount of 80% by weight or less based on the weight of the sucrose fatty acid ester emulsifier admixed with the plant sterol.

* * * * *

UNITED STATES PATENT AND TRADEMARK OFFICE
CERTIFICATE OF CORRECTION

PATENT NO. : 7,994,157 B2
APPLICATION NO. : 10/398001
DATED : August 9, 2011
INVENTOR(S) : Won-Tae Yoon et al.

Page 1 of 1

It is certified that error appears in the above-identified patent and that said Letters Patent is hereby corrected as shown below:

Column 18, lines 3-9 (Claim 2), please delete "stirring the combination at a speed of 5,000 to 10,000 rpm and homogenizing to give a plant sterol-dispersed beverage, wherein when said aqueous beverage is water, said plant sterol-dispersed beverage has a transmittance at 700 nm of 80.0% or greater, whereby the plant sterol is dispersed into particles, wherein 90% or more of the particles have a size of 300 nanometers or less." and insert -- stirring the combination at a speed of 5,000 to 10,000 rpm and homogenizing to give a plant sterol-dispersed beverage, wherein when said aqueous beverage is water, said plant sterol-dispersed beverage has a transmittance of 700 nm of 80.0% or greater,
  whereby the plant sterol is dispersed into particles, wherein 90% or more of the particles have a size of 300 nanometers or less. -- therefor;

Column 18, line 62 (Claim 11), please delete "any" and insert -- any one -- therefor;

Column 19, lines 18-19 (Claim 18), please delete "1:10-10, 000 (w/w)" and insert -- 1:10-10,000 (w/w) -- therefor;

Column 19, line 20 (Claim 19), please delete "claim 8" and insert -- claim 18 -- therefor.

Signed and Sealed this
Sixth Day of March, 2012

David J. Kappos
*Director of the United States Patent and Trademark Office*